United States Statutory Invention Registration [19]

[11] Reg. Number: H105

Gould et al. [45] Published: Aug. 5, 1986

[54] LIGHTWEIGHT HYDRAULICALLY FIRED MINESWEEPING CUTTER

[75] Inventors: Paul F. Gould; William A. Everritt, both of Panama City, Fla.

[73] Assignee: The United States of America as represented by the secretary of the Navy, Washington, D.C.

[21] Appl. No.: 751,831

[22] Filed: Jul. 5, 1985

[51] Int. Cl.[4] ..... B63B 9/03; F42B 3/00

[52] U.S. Cl. ..... 89/1.14; 114/221 A

[58] Field of Search ..... 114/221 A; 83/370, 639; 89/1.14; 102/307

[56] References Cited

U.S. PATENT DOCUMENTS

| | | | |
|---|---|---|---|
| 1,304,549 | 4/1919 | Dupont | 89/1.14 |
| 2,422,506 | 6/1947 | Temple | 114/221 A |
| 2,806,442 | 10/1943 | Temple | 114/221 A |
| 3,246,396 | 4/1966 | Temple et al. | 83/639 |
| 3,760,674 | 9/1973 | Temple et al. | 114/221 A |
| 4,040,376 | 7/1976 | Giebel | 114/221 A |
| 4,074,650 | 4/1963 | Dyjak | 114/221 A |

*Primary Examiner*—David H. Brown

*Attorney, Agent, or Firm*—Robert F. Beers; Harvey A. David

[57] ABSTRACT

A minesweeping cutter device includes a tubular body closed at one end and having a cable engaging recess at the other end, a barrel member reciprocable in the body by cable engagement to fire a chisel propelling charge. The chisel has its cutting edge spaced from the cable until the charge is fired so that a reliable cutting velocity is achieved before impact. An erecting vane has a sweep wire channel and is provided with a sliding gate on a guide rail that diverges angularly from the axis of the channel.

4 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LIGHTWEIGHT HYDRAULICALLY FIRED MINESWEEPING CUTTER

BACKGROUND OF THE INVENTION

This invention relates to the field of minesweeping, and more particularly to an improved cutter device for severing mine mooring cables engaged by a sweep wire.

It has been the practice to provide the sweep wire of towed minesweeping gear with one or more explosively actuated cutters for severing the mine mooring cables. The cutters typically comprise a body mounted on the sweep wire and having a jaw or hook which is engaged by a mooring cable as it slides along the towed sweep wire. The body is usually provided with a vane that assumes a horizontal position aft of the sweep wire during tow and positions the body with the jaw or hook ready to be engaged by a mooring cable. Upon such engagement a firing sequence is initiated to propel a chisel through the cable to sever it, usually against an anvil.

U.S. Pat. No. 2,422,506 provides an example of a minesweeping cutter wherein the firing mechanism is a spring and lever apparatus and the cable is backed by an anvil during cutting. U.S. Pat. No. 3,760,674 utilizes a spring driven plunger and hydraulic column means in the firing mechanism, and an anvil. U.S. Pat. No. 4,074,650 discloses a firing mechanism wherein the chisel is engaged by the mooring cable and displaced with its barrel to shear a pin and allow a spring to drive the barrel rearwardly so that a confined slug of seawater causes a piston carried firing pin to actuate an explosive cartridge. In that device the chisel is intended to be driven through the mooring cable without benefit of backing by an anvil, or the like. While the lack of an anvil is desirable from the standpoint of cost and simplicity, the configuration taught in the mentioned patent has the shortcoming of not developing an impact velocity in the chisel before contact with the cable, and hence is limited in severing capability.

The use of springs, levers, and the like, in the firing mechanism not only reduces reliability and adds to initial cost, but also increases the time and effort that must be expended in disassembly, cleaning, lubricating and reassembly after streaming. Moreover, existing cutter devices incorporate complex means of attachment to the sweep wire, often requiring the use of both hands, thereby adding to personnel risk in heavy weather.

SUMMARY OF THE INVENTION

With the foregoing in mind, it is a principal object of this invention to provide an improved, lightweight, minesweeping cable cutter.

Another object is to provide a cable cutter that avoids use of springs, levers, and the like in the firing mechanism.

Yet another object is to provide a mine mooring cable cutter that is lightweight, relatively inexpensive, and easy to attach to or remove from a sweep wire.

As another important object, the invention aims to provide a simplified and yet more effectual mine cable cutter of the type wherein the chisel severs the mooring cable without use of an anvil.

Other objects and many of the attendant advantages will be really appreciated as the subject invention becomes better understood by reference to the following detailed description, when considered in conjunction with the accompanying drawings.

DESCRIPTION OF THE PREFERRED EMBODIMENT

Figure 1:
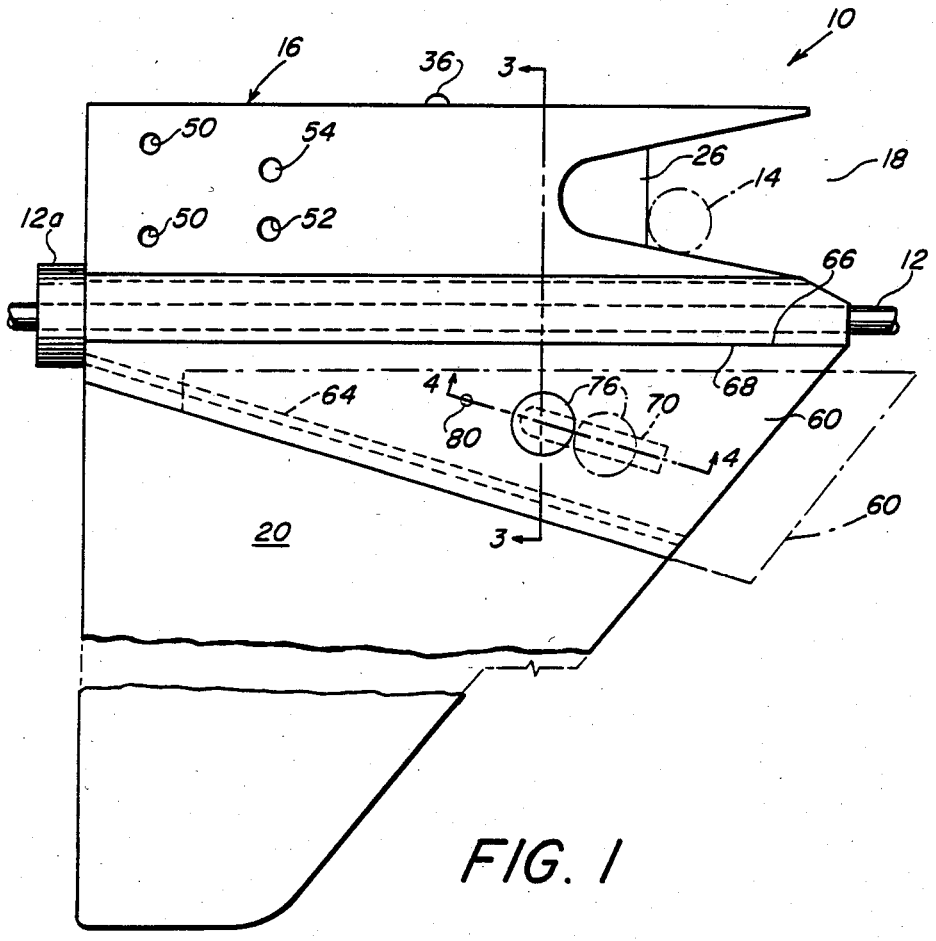
FIG. 1 is a plan view of a minesweeping cutter embodying the invention.

In the exemplary form of the invention illustrated in the drawings and described hereinafter, and with reference first to FIG. 1, a minesweeping cutter 10 is adapted to be streamed on a sweep wire 12 as one of a plurality of such cutters, spaced therealong by stops 12*a*, for the purpose of severing mine mooring cables such as a cable 14. The device 10 comprises a generally cylindrical cutter body 16 having one end formed to define a V-shaped recess 18. Mounted on the body 16 is a vane 20 which lies in a horizontal plane during tow and serves to position the body 16 with the recess 18 oriented to receive a vertical mooring cable 14 which is engaged by the sweep wire 12 and slides therealong into the recess.

Figure 2:
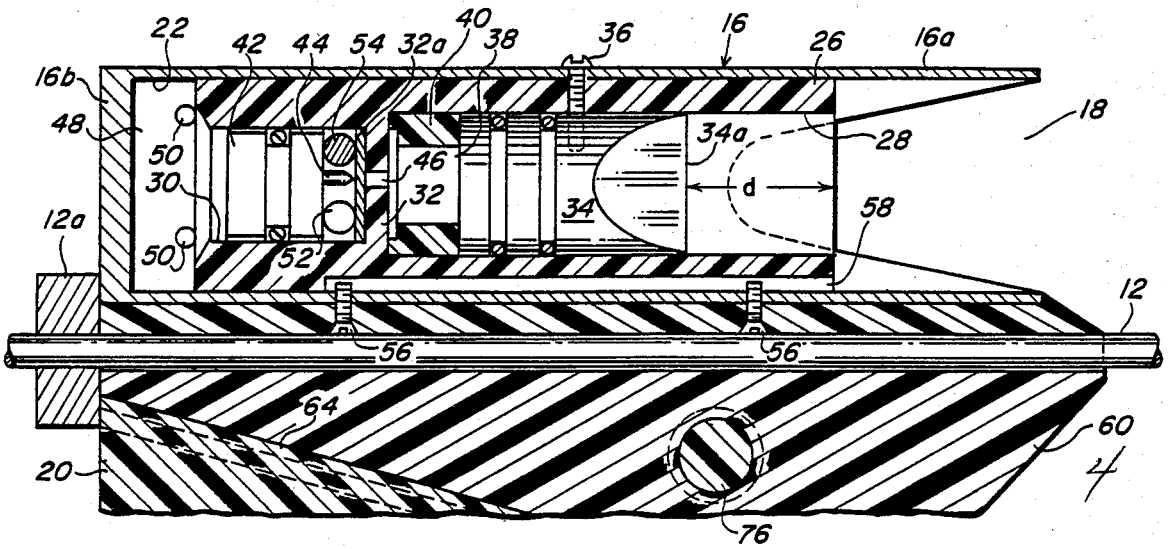
FIG. 2 is a fragmentary longitudinal sectional view of the cutter of FIG. 1.

Referring now to FIG. 2, it will be seen that the body 16 comprises a tubular wall portion 16*a* defining a lumen or bore 22 that is open at the end having recess 18, and an end wall 16*b* closing the bore 22 at the opposite end. The body 16 is advantageously made of stainless steel or other high strength, corrosion resistant material. Disposed in bore 22 of body 16 is a barrel 26, conveniently formed of a rigid, dimensionally stable plastic material such as nylon, "DELRIN," or the like. Barrel 26 has a nice sliding fit within bore 22 and is formed to define first and second, axially aligned cylindrical bores 28 and 30 separated by a wall 32 and pierceable metal diaphragm or disc 32*a*. Bore 28, which opens in the jaw or recess 18 at the open end of body 16, carries an explosively driven cutting chisel 34. The chisel 34 is normally restrained against movement in bore 28, and the barrel 26 is normally restrained against movement in bore 22, by a shear pin or screw 36 extending through wall 16*a*, through the wall of barrel 34 and into chisel 34. Loaded in barrel 34 behind the chisel 34 is an explosive cartridge 36 surrounded by a spacer ring 40.

Disposed in the bore 30 of barrel 26 is a piston 42 carrying an axial firing pin 44 adapted to be driven by piston 42 through metal diaphragm or disc 32*a* and an aperture 46 in wall 32 into a percussion primer of cartridge 38. Barrel 26 and piston 42, together with body 16 define a chamber 48 that is adapted to be flooded by seawater through holes 50 in wall 16*a* during towing. Similarly, the space between piston 42 and disc 32*a* is flooded via holes 52. A pin 54 is conveniently inserted in one of the openings 52 to preclude any possibility of the piston 42 and firing pin 44 inadvertently moving and firing the device. The pin 54 is withdrawn just prior to streaming.

The body 16 and vane 20 are secured together by screws 56, the ends of which project into an axial groove 58 in the surface of barrel 26. The groove and screw ends cooperate to maintain the barrel in a rotative position such that the cutting edge 34*a* of the chisel 34 is transverse to the mooring cable receiving jaw or recess 18 and to a mooring cable when engaged therein.

It is important to note that the forward end portion of the barrel 26 is exposed in recess 18 and that a portion of the barrel extends beyond the cutting edge 34*a* of the chisel by a distance d. This distance, as will become more apparent in the description of the operation, is necessary to reliable operation of the cutter.

Figure 3:
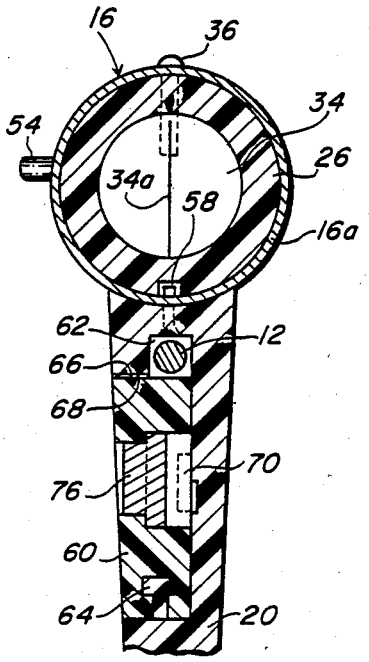
FIG. 3 is a sectional view taken substantially along line 3—3 of FIG. 1.

The erecting fin or vane 20 is preferably formed of a suitable rigid plastic material and is configured to cooperate with an easily operated gate member 60 for use in attaching the cutter to or removing it from the sweep wire 12. Gate member 60 is generally triangular in shape and is slidably movable between its closed or full line position and an open or dot and dash line position. Referring additionally to FIG. 3, the fin 20 defines a channel 62 in which the sweep wire 12 is confined by the closed gate 60. The gate is slidably mounted on a guide rail 64 and because of the angle of divergence of the rail 64 from the axis of the channel 62, movement of the gate toward its dot and dash position of FIG. 1 creates an opening between the gate edge 66 and the edge 68 of the channel through which the sweep wire can pass.

Figure 4:
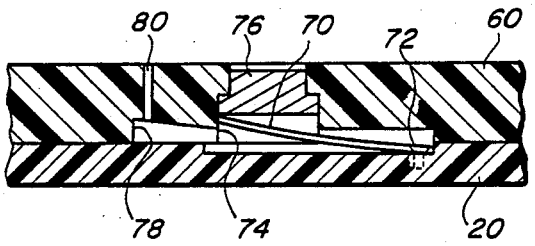
FIG. 4 is a sectional view taken substantially along line 4—4 of FIG. 1.

The gate 60 is provided with a latch for releasably securing the gate in its closed position. To this end, a flat or reed spring detent 70 has one end fixed at 72 to the fin 20, as is best shown in FIG. 4, and has its free end engagable in a recess 74 of the gate 60. A push-button 76 is carried in the gate 60 and is operable to depress the spring detent 70 to disengage its free end from the recess 74 to release the gate for sliding movement to its open position, in which position the free end of the spring detent engages a second recess to prevent further movement of the gate in the opening direction. Upon return of the gate to its closed position, the spring detent automatically latches it. A small hole 76 is provided in gate 60 for insertion of a probe to depress the detent and allow disassembly of the gate from the fin. The device 10, with its gate open, is readily hung on a sweep wire 12 with one hand, and the gate then closed by simply striking it toward its closed position.

MODE OF OPERATION

A mine mooring cable 14, engaged in recess 18 during a sweep operation, presses with increasing force against the exposed end portion of barrel 26 until the shear screw 36 suddenly yields between wall 16*a* and the barrel allowing the barrel, chisel 34, and piston 42 to abruptly move rearwardly in unison toward end wall 16*b* until holes 50 are covered by the barrel. Thereafter, rearward movement of barrel 26 causes water in chamber 48 to move piston 42 forward relative to the barrel so that firing pin 44 is rapidly driven through disc 32*a* into the primer of explosive cartridge 38. The cartridge is thereby detonated and builds pressure behind the chisel 34 until the screw shears between the chisel and the barrel allowing the chisel to be abruptly driven forward in the barrel with great acceleration. The earlier mentioned distance d that is traveled by the chisel before impact with the cable 14 permits the chisel to attain such a velocity that the cable 14 is readily severed even without backup, as by an anvil.

The screws 56 securing the body 16 to the fin 20 and the strength of the plastic section through which they extend are so selected that the reactive kick-back or recoil of the body upon discharge of the chisel causes the body to rip free from the vane 20. Accordingly, having once been discharged or fired, the body 16 of the cutter device 10 is no longer present on the sweep wire and a subsequent mooring cable will be engaged and cut by the next cutter device on the sweep cable.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A mine mooring cable cutter device for use on a sweep wire, said device comprising:

a tubular metal cutter body defining a lumen closed at one end of the body and opening in a V-shaped recess at the other end that is engageable by a mooring cable;

an erecting vane formed of plastic material attached to and extending laterally from said body for holding said body in a predetermined attitude, said erecting vane comprising a vane element defining therein a longitudinal channel adapted to receive a sweep wire, a guide rail formed in said vane and having an angle of divergence relative to said channel, a generally triangular gate member slidably mounted on said guide rail for sliding movement therealong between open and closed positions relative to said channel, and latch means for releasably holding said gate member in said closed position;

a plastic barrel member carried in said body lumen and having an outer end portion exposed in said recess for engagement and movement by a mooring cable, said barrel member having an axial bore in said outer end portion;

a chisel disposed in said axial bore of said barrel member and having a cutting edge disposed a predetermined distance within said end portion;

explosive charge means disposed in said axial bore for propelling said chisel;

said barrel member being releasably held against movement relative to said body by a shear element so as to shear said element and move abruptly upon a predetermined force exerted on said barrel member by a mine mooring cable;

said chisel being releasably held against movement relative to said barrel member by a shear element so as to shear said element and move abruptly upon a predetermined force exerted on said chisel by said explosive charge, said barrel member having another axial bore in its inner end portion separated from the first mentioned axial bore by wall means;

a piston disposed in said other axial bore of said barrel member;

a firing pin mounted on said piston;

said barrel member, said piston and said closed end of said body defining a chamber;

an opening through said body member into said lumen for flooding said chamber with water prior to firing, said opening being closed by said barrel member upon said movement relative to said body so that water in said chamber acts on said piston to drive said firing pin through said wall means to fire said explosive charge solely by the force of said mooring cable acting against said barrel member, whereby said chisel is accelerated through said predetermined distance before impacting and severing said mooring cable without backing of said cable by anvil means.

2. A cutter device as defined in claim 1, and wherein:

said barrel member is releasably held against movement relative to said body by a shear element so as to shear said element and move abruptly upon a predetermined force exerted on said barrel member by a mine mooring cable; and said chisel is releasably held against movement relative to said barrel member by a shear element so as to shear said element and move abruptly upon a predetermined force exerted on said chisel by said explosive charge.

3. A cutter device as defined in claim 1, and wherein said erecting vane comprising:

a vane element defining a longitudinal channel adapted to receive a sweep wire;

a gate member slidably mounted on said vane element for movement in directions angularly divergent to said longitudinal channel between open and closed positions; and latch means for releasably holding said gate member in said closed position.

4. A cutter device as defined in claim 3, and wherein:

said body comprises a bore closed at one end and opening at the other end in said cable engaging recess;

said barrel member being mounted in said bore of said body and having another axial bore in its inner end portion and separated the first mentioned axial bore by wall means;

a piston disposed in said other axial bore of said barrel member;

a firing pin mounted on said piston;

said barrel member, said piston and said closed end of said body defining a chamber;

passage means for flooding said chamber with water prior to firing, said passage means being closed by said movement of said barrel member relative to said body;

whereby water in said chamber acts on said piston to drive said firing pin through said wall means to fire said explosive charge solely by the force of said mooring cable acting against said barrel member.

* * * * *